UNITED STATES PATENT OFFICE.

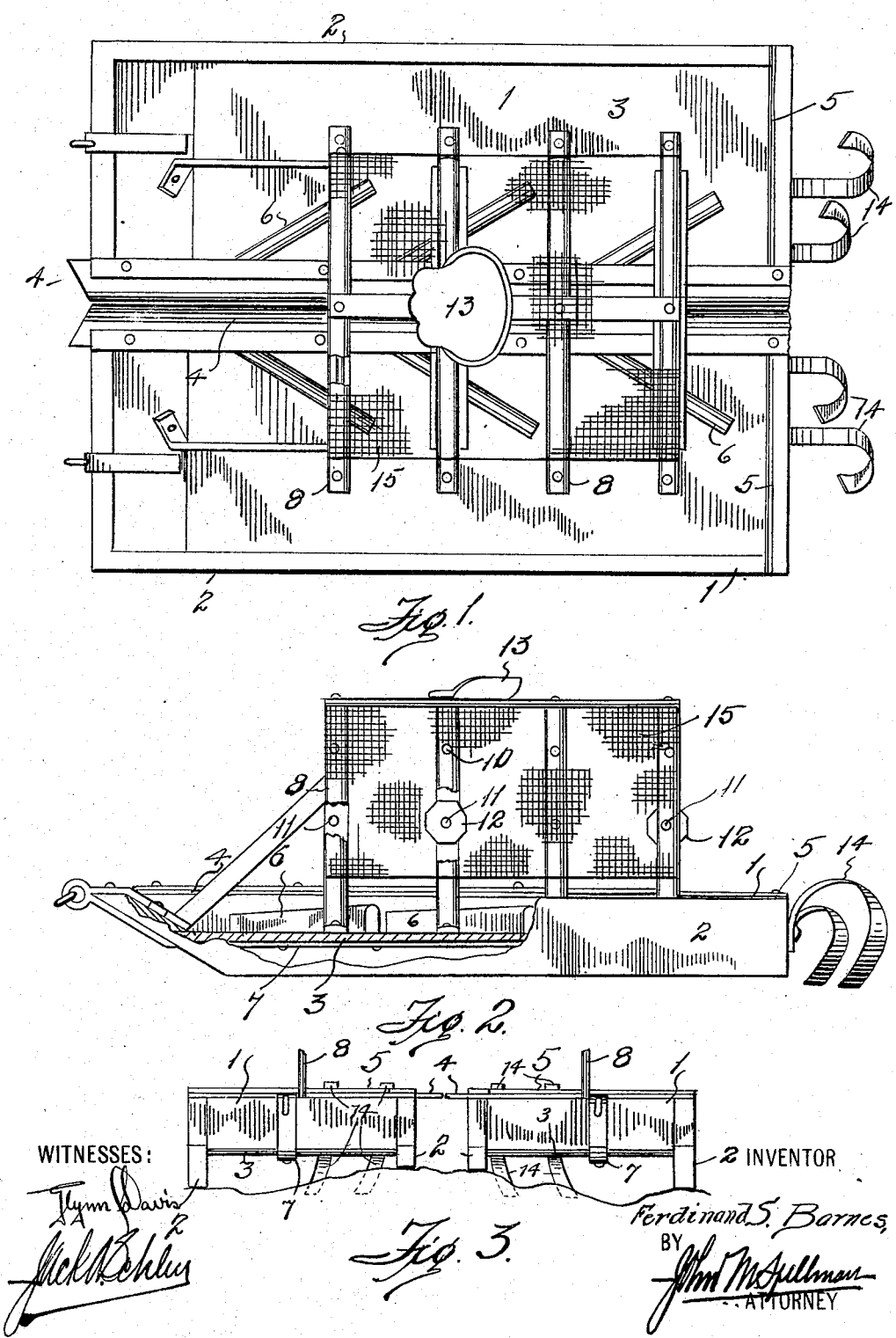

FERDINAND S. BARNES, OF LINDALE, TEXAS, ASSIGNOR OF ONE-HALF TO RILEY G. MARCHMAN AND ONE-HALF TO JAMES A. THEDFORD, OF LINDALE, TEXAS.

GATHERING-MACHINE.

932,670.  Specification of Letters Patent.  Patented Aug. 31, 1909.

Application filed April 23, 1908. Serial No. 428,710.

*To all whom it may concern:*

Be it known that I, FERDINAND S. BARNES, citizen of the United States, residing at Lindale, in the county of Smith and State of Texas, have invented certain new and useful Improvements in Gathering-Machines, of which the following is a specification.

My invention relates to new and useful improvements in gathering machines and more particularly to machines designed to gather boll-weevils and other insects from the growing cotton plant.

The object of the invention is to provide a device which will collect from plants boll-weevils and other insects as well as dead squares and other refuse which may have collected on the plant.

Another feature resides in the provision of means for throwing such weevils and other insects as may fall upon the ground to the center of the furrow and thus exposing them to the direct rays of the sun.

Finally the object of the invention is to provide a device of the character described that will be durable and efficient, which will be simple and comparatively inexpensive to construct and one in which the several parts will not be likely to get out of working order.

With the above and other objects in view, my invention has particular relation to certain novel features, an example of which is described in the specification and illustrated in the accompanying drawings, wherein:

Figure 1 is a plan view of my device, Fig. 2 is a side elevation with a portion of the side broken away so as to expose the bottom thereof, and Fig. 3 is an end elevation with the top portion removed.

Referring now more particularly to the drawings wherein like numerals of reference refer to similar parts in all the drawings, the numeral 1 designates the troughs which are intended to catch the insects, etc., which may be knocked from the plants. These troughs are provided with runners 2 on either side and have a bottom 3 of sheet iron or other suitable material extending the full length of the trough and which turns up in front to the top of the runners. The sides and rear of the troughs are also lined with metallic lining. The inner runner of each trough is made somewhat lower than the outer in order that the troughs may be practically level when in use. This difference in height is made necessary by reason of the fact that the earth near the row is usually ridged up and higher than in the center of the furrow.

The inner runners are each provided at the top with flexible shields 4 of rubber or some similar material designed to extend over the edges of the troughs and to pass on either side of the row. These shields pass closely around the plant and are intended to prevent the weevils or insects from falling between the troughs. The rear of each trough is also provided with a shield 5 of some soft material to serve as a protection to the plants.

Each trough is provided with guards 6 extending from the inner side in a diagonally rearward direction to near the center of the troughs. These guards serve as supports for the branches of the plants and thus prevent them from falling down into the troughs and sweeping out the contents thereof. Each trough is also provided with a metal brace 7 extending from the rear, under the bottom, to the front thereof. These braces serve not only as bases for the inverted U-shaped supports 8 but are so shaped in front as to provide a suitable hitching place.

The supports 8 may be made of any desired height and are pivotally fastened to the braces 7 by means of metal bolts. They are thus movably fastened so as to permit one trough to run ahead of the other in turning around. Each support is provided with a number of holes 10 intended to receive cross-rods 11, upon either or each of which a revoluble many sided roller 12 may be placed. The holes in these supports are so located that the cross-rod and rollers may be raised or lowered to suit either small or large plants. A seat 13 is firmly fastened upon one of the supports.

At the rear of each trough, cultivator blades 14 are firmly fastened. These blades are so shaped as to throw the dirt outward from the row toward the center of the furrow and the inner blades are each followed by blades, similarly shaped, and so located as to catch the dirt thrown out by the inner blade and in turn throw it out farther toward the center of the furrow. These blades serve not only to plow up and cultivate the soil but also to throw the weevils and insects which may have fallen to the ground to the center of the furrow thereby bringing them into the direct rays of the sun.

In operating this machine, it is intended that each trough shall travel along the furrow allowing the growing cotton, or other plants, to pass between the troughs. The front rod 11 bends the plant down and as soon as it is released from this position, it strikes against the roller 12. This roller, having many sides, in turning agitates the plant and thereby shakes off the insects. This process is repeated by each succeeding rod and roller until the plant is effectually relieved of all weevils and insects as well as the dead squares etc.

The troughs should be filled with water, oil or some other liquid so as to retain all the insects which may fall into them.

It is intended that a fine wire netting 15 be stretched closely over the top and along the sides of the supports so as to conduct as many of the insects as possible into the troughs.

What I claim, is:

1. In a device of the character described, a pair of portable troughs, means for connecting the troughs so as to form a passage way therebetween, means for closing the passage way, supports pivotally fastened to the troughs, braces serving as a base for said supports, rearwardly diverging guards located at the inner side of the troughs, and cultivating devices attached to the rear of the troughs.

2. In a device of the character described, the combination with portable troughs having a passage-way there-between, of supports pivotally mounted on said troughs, means for yieldably closing the passageway, and agitating means located above the passage-way.

3. In a device of the character described, the combination with portable troughs, of guards located within the troughs, a guard located on the rear of each trough, outwardly deflecting cultivators attached to the rear of the troughs, means for connecting and maintaining the troughs in opposed relation, and agitators supported by the last named means.

4. In a device of the character described, the combination with portable and connected troughs, of a longitudinal brace carried on the under side of each trough, guards located within said troughs, guards on the rear ends of the troughs, and agitators carried by the troughs.

5. In a device of the character described, portable troughs connected so as to provide a longitudinal space therebetween to receive grown cotton stalks, the troughs being arranged to travel, one on each side of the row, agitators carried by the troughs over the space therebetween arranged to engage the cotton stalks, and means arranged at the rear end of the trough for moving fallen squares and boll weevils to each side and away from the row.

In testimony whereof I have signed my name to this specification in the presence of two subscribing witnesses.

FERDINAND S. BARNES.

Witnesses:
F. M. BOYD,
J. L. BRAZIEL.